(12) United States Patent  (10) Patent No.: US 7,627,870 B1
Michaeli et al.  (45) Date of Patent: Dec. 1, 2009

(54) METHOD AND APPARATUS FOR A DATA STRUCTURE COMPRISING A HIERARCHY OF QUEUES OR LINKED LIST DATA STRUCTURES

(75) Inventors: Amir Michaeli, Hertzelya (IL); Vitaly Sukonik, Katzir (IL)

(73) Assignee: Cisco Technology, Inc., San Jose, CA (US)

( * ) Notice: Subject to any disclaimer, the term of this patent is extended or adjusted under 35 U.S.C. 154(b) by 669 days.

(21) Appl. No.: 09/845,606

(22) Filed: Apr. 28, 2001

(51) Int. Cl.
 *G06F 9/54* (2006.01)
 *H04L 12/28* (2006.01)
(52) U.S. Cl. .................. 719/313; 370/396; 370/394; 370/412
(58) Field of Classification Search ............ 719/313, 719/310; 395/200; 370/389, 394, 412, 396
 See application file for complete search history.

(56) References Cited

U.S. PATENT DOCUMENTS

| | | | |
|---|---|---|---|
| 5,519,701 A | 5/1996 | Colmant et al. | |
| 5,561,663 A | 10/1996 | Klausmeier | |
| 5,629,928 A | 5/1997 | Calvignac et al. | |
| 5,765,032 A | 6/1998 | Valizadeh | |
| 5,838,915 A * | 11/1998 | Klausmeier et al. | 395/200.45 |
| 5,838,994 A | 11/1998 | Valizadeh | |
| 5,875,176 A * | 2/1999 | Sherer et al. | 370/230 |
| 6,247,061 B1 * | 6/2001 | Douceur et al. | 709/240 |
| 6,262,986 B1 * | 7/2001 | Oba et al. | 370/399 |
| 6,424,659 B2 * | 7/2002 | Viswanadham et al. | 370/469 |
| 6,570,850 B1 * | 5/2003 | Gutierrez et al. | 370/231 |
| 6,683,884 B1 * | 1/2004 | Howard | 370/412 |
| 6,728,256 B1 * | 4/2004 | Henrion | 370/429 |
| 6,845,105 B1 * | 1/2005 | Olsson et al. | 370/469 |
| 6,850,516 B2 * | 2/2005 | Bennett et al. | 370/357 |
| 7,002,916 B2 * | 2/2006 | Parruck et al. | 370/235 |
| 7,047,312 B1 * | 5/2006 | Aweya et al. | 709/235 |
| 2001/0033581 A1 * | 10/2001 | Kawarai et al. | 370/468 |
| 2002/0126673 A1 * | 9/2002 | Dagli et al. | 370/392 |

\* cited by examiner

*Primary Examiner*—Li B Zhen
(74) *Attorney, Agent, or Firm*—The Law Office of Kirk D. Williams

(57) ABSTRACT

Systems and methods are disclosed for implementing and using data structures comprised of a hierarchy of queues or linked list data structures. A queue or linked list typically comprises a distributor, a plurality of sub-queues or sub-linked lists, and a receiver. The distributor distributes a plurality of items to be added to the queue or linked list to the plurality of sub-queues or sub-linked lists in an order, and the receiver receives the items from these elements in the same order. Entries for the queues and/or linked lists may be stored in a common memory. Stages of selectors may be used to select a current queue or linked list and a particular sub-queue or linked list. The number of queues/linked lists and sub-queues/sub-linked lists is unbounded and can be sized according to the needs of the system, such as to overcome a memory access speed limitation.

17 Claims, 7 Drawing Sheets

US 7,627,870 B1

METHOD AND APPARATUS FOR A DATA STRUCTURE COMPRISING A HIERARCHY OF QUEUES OR LINKED LIST DATA STRUCTURES

FIELD OF THE INVENTION

This invention relates to computer and communications systems; and more particularly, the invention relates to implementing and using data structures such as queues and linked lists comprised of a hierarchy of queues or linked list data structures.

BACKGROUND OF THE INVENTION

The computer and communications industries are rapidly changing to adjust to emerging technologies and ever increasing customer demand. This customer demand for new applications and increased performance of existing applications is driving computer system manufacturers and communications network and system providers to build networks and systems having greater speed and capacity. In trying to achieve these goals, a common approach taken is to use packet communications and switching technologies operating at ever increasing rates. However, many prior systems are unable to receive and process the information (e.g., packets) received at these higher communications rates. Compounding the problem further, many of the previous techniques are not scalable for use in the faster systems, and thus, new systems and methods are required.

For example, in one implementation of a line card of a communications system, a large number of queues are required to support the various types and destinations of traffic as well as to operate at high data rates (e.g., 125 million packets per second). A well-known technique for implementing a queue is to use a linked list data structure. To operate at the high data rates, an implementation might require very fast data storage elements (e.g., register arrays or flops), and given the typical number of queues required, the number of storage elements required may be too large to implement on an application-specific integrated circuit (ASIC). Also, if an internal or external SRAM is used by an ASIC to implement the queues, the memory access rates of known SRAMs are not fast enough to support the rate required to access and manipulate elements of a queue or linked list implemented using conventional techniques. Thus, needed are new systems and methods for implementing queues and/or linked list data structures.

SUMMARY OF THE INVENTION

Systems and methods are disclosed for implementing and using queues and/or linked list data structures comprised of a hierarchy of queues or linked list data structures. In one embodiment, a data structure comprises a distributor, a plurality of sub-data structures, and a receiver. The distributor distributes a plurality of items to be added to the data structure to the plurality of sub-data structures in an order. The receiver receives the items from the plurality of sub-data structures in the same order.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
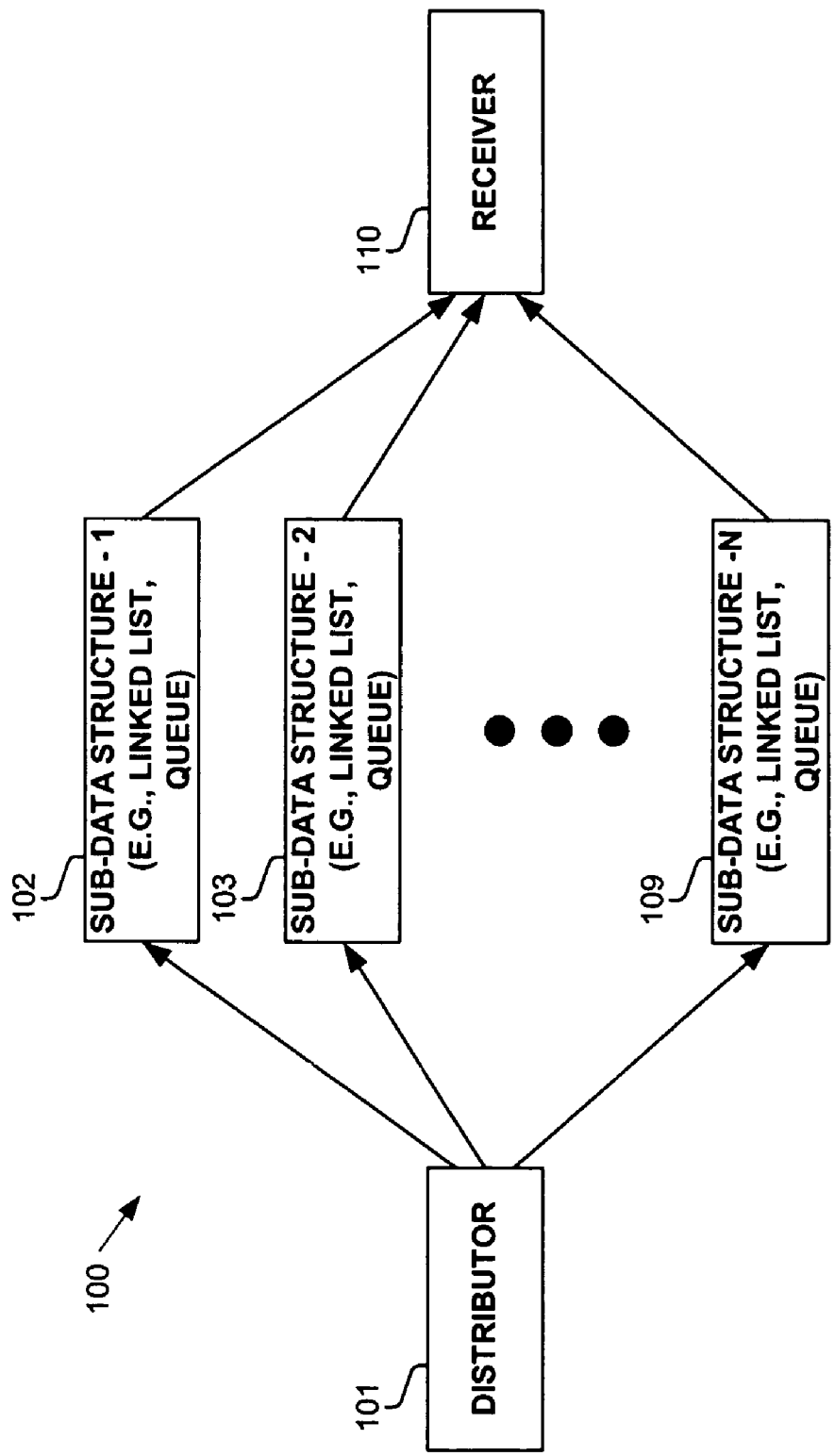
FIG. 1A is a block diagram illustrating one embodiment of a data structure comprising multiple sub-data structures.

Methods and apparatus are disclosed for implementing and using data structures comprised of a hierarchy of queues or linked list data structures which may be used, inter alia, in a computer or communications system, such as a computer or communications device, workstation, packet switching system, router, other device, or component thereof. Such methods and apparatus are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

Systems and methods are disclosed for data structures comprised of a hierarchy of queues or linked list data structures. These queues and/or linked lists may be used, inter alia, in a computer or communications device, workstation, packet switching system, router, other device, or component thereof. In one embodiment, a queue or linked list comprises a distributor, a plurality of sub-queues or sub-linked lists, and a receiver. The distributor distributes a plurality of items to be added to the queue or linked list to the plurality of sub-queues or sub-linked lists in an order. The receiver receives the items from the plurality of sub-queues or sub-linked lists in the same order. One embodiment stores entries for the queues and/or linked lists in a common memory, and uses stages of selectors to select a current queue or linked list and a particular sub-queue or linked list. The number of queues/linked lists and sub-queues/sub-linked lists is unbounded and can be sized according to the needs of the system and its implementation. In this manner, certain systems employing the distributed queues and/or linked lists may overcome certain implementation constraints, such as, but not limited to memory access speed.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, networks, computer and/or communication devices or mechanisms, or combinations of components thereof. The term "computer" is used generically herein to describe any number of computers, including, but not limited to personal computers, embedded processors, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating address spaces, a routine of a library and/or standalone application, and is not limited to any particular memory partitioning technique. The terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

FIG. 1A illustrates one embodiment of a data structure 100 comprised of a hierarchy of sub-data structures 102-109. Distributor 101 distributes items of information to be stored in N sub-data structures 102-109 typically in a predetermined order (e.g., round robin), although other discriminatory methods could be used, such as data structure occupancy or availability which may become important if sub-data structures 102-109 are implemented with varying sizes, access speeds, technologies, etc. The number of sub-data structures 102-109 used in an embodiment is typically sized to match the needs of the application and speed of the implementation technology. For example, the number of sub-data structures 102-109 used in one embodiment may be calculated by rounding up the access rate requirement of the system (e.g., in cycles or time) divided by the memory access rate, while other embodiments might use more sub-data structures 102-109 than this calculated number. Receiver 110 receives, which may include extracting, the items of information stored in sub-data structures 102-109.

A queue embodiment of data structure 100 typically requires distributor 101 to distribute the items of information to be stored in sub-data structures 102-109 in a predetermined order (e.g., using a round robin or other technique) and receiver 110 to receive and/or extract the items of information from sub-data structures 102-109 in the same predetermined order. In one embodiment of a queue, distributor 101 distributes items to the different sub-data structures 102-109 based on a random order, pseudo random order, predetermined order or using another discriminatory method with this order being communicated to the receiver (e.g., via a link, common data structure, shared memory, etc.) In this manner, in a queue embodiment of data structure 100, receiver 110 will receive items of information in the same order that distributor 101 stored the items in sub-data structures 102-109.

Figure 1B:
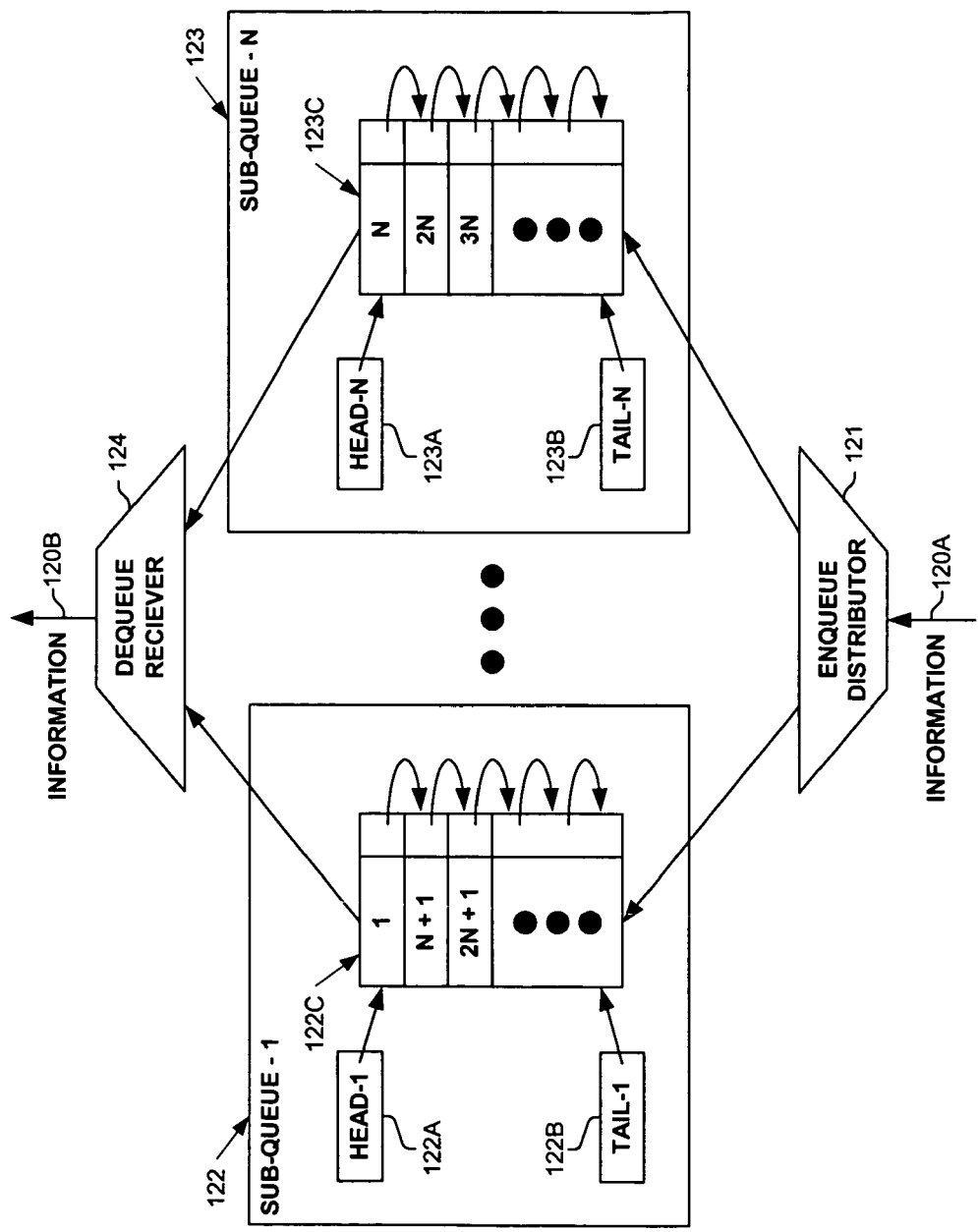
FIG. 1B is a block diagram illustrating one embodiment of a queue comprising multiple sub-queues implemented using linked list data structures.

FIG. 1B illustrates one embodiment of a queue using N sub-queues 122-123. Information is received in information stream 120A (e.g., a sequence of packets, blocks of information). Enqueue distributor 121 distributes the information among N sub-queues 122-123 typically in a predetermined order, although another ordering could be used. In one embodiment, enqueue distributor 121 also includes a data manipulation and/or segregation function. Each sub-queue 122-123 includes a linked list data structure 122C and 123C with head of list pointers 122A and 123A and tail of list pointers 122B and 123B. Items are typically added to sub-queues 122-123 in a round-robin fashion to the end of linked list data structures 122C-123C such that every Nth item is placed in the same one of the queues 122-123. Dequeue receiver 124 receives, possibly including extracting, the stored items in the same order as placed in sub-queues 122-123 to produce information stream 120B.

Figure 1D:
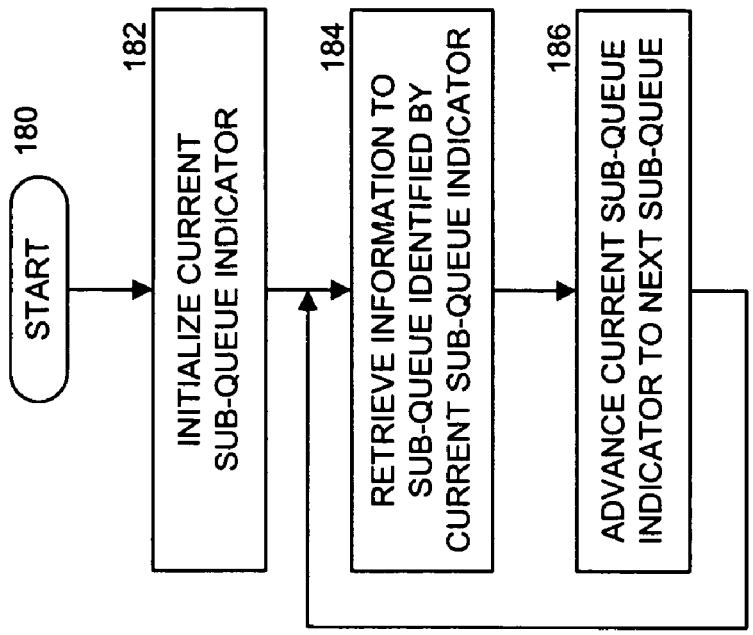
FIGS. 1C-D are flow diagrams of processes used in one embodiment for enqueuing and dequeuing elements of a queue comprising multiple sub-queues.
Figure 1C:
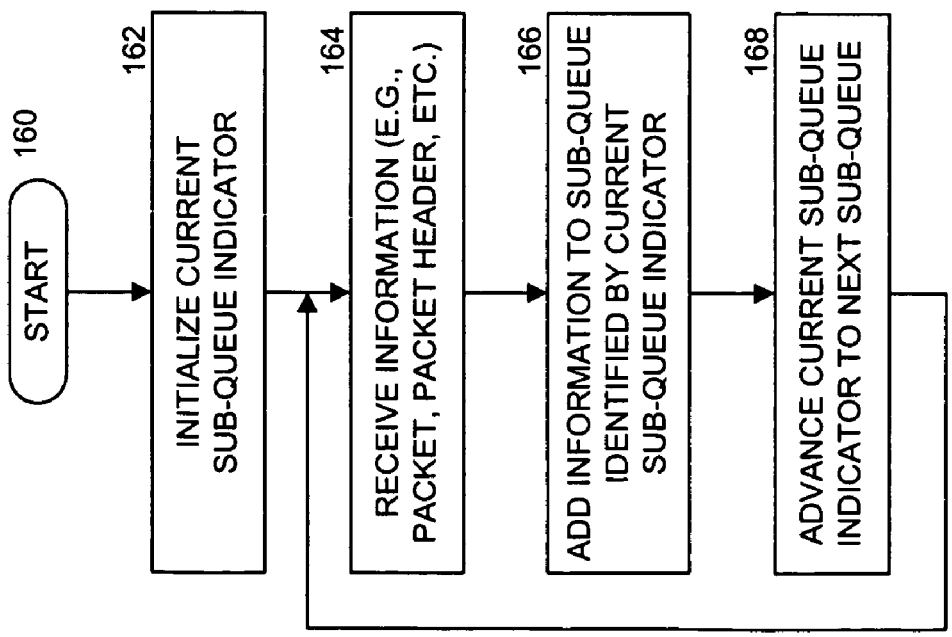

FIGS. 1C-D illustrate embodiments of processes for enqueuing and dequeuing elements to a queue comprised of multiple sub-queues. Processing of the flow diagram illustrated in FIG. 1C commences with process block 160, and proceeds to process block 162, wherein a current sub-queue indicator is initialized to one of the multiple sub-queues. Next, in process block 164, information to be stored in one of the sub-queues is received. In process block 166, this received information is placed in the sub-queue indicated by the sub-queue indicator. The sub-queue indicator is then advanced to the next sub-queue in the predetermined order in process block 168. Process blocks 164-168 are repeated to distribute received information to the various sub-queues.

Processing of the flow diagram illustrated in FIG. 1D commences with process block 180, and proceeds to process block 182, wherein a current sub-queue indicator is initialized to one of the multiple sub-queues. Next, in process block 184, information is retrieved from the sub-queue indicated by the sub-queue indicator. The sub-queue indicator is then advanced to the next sub-queue in the predetermined order in process block 186. Process blocks 184-186 are repeated to reproduce the information in the order initially received.

Figure 2A:
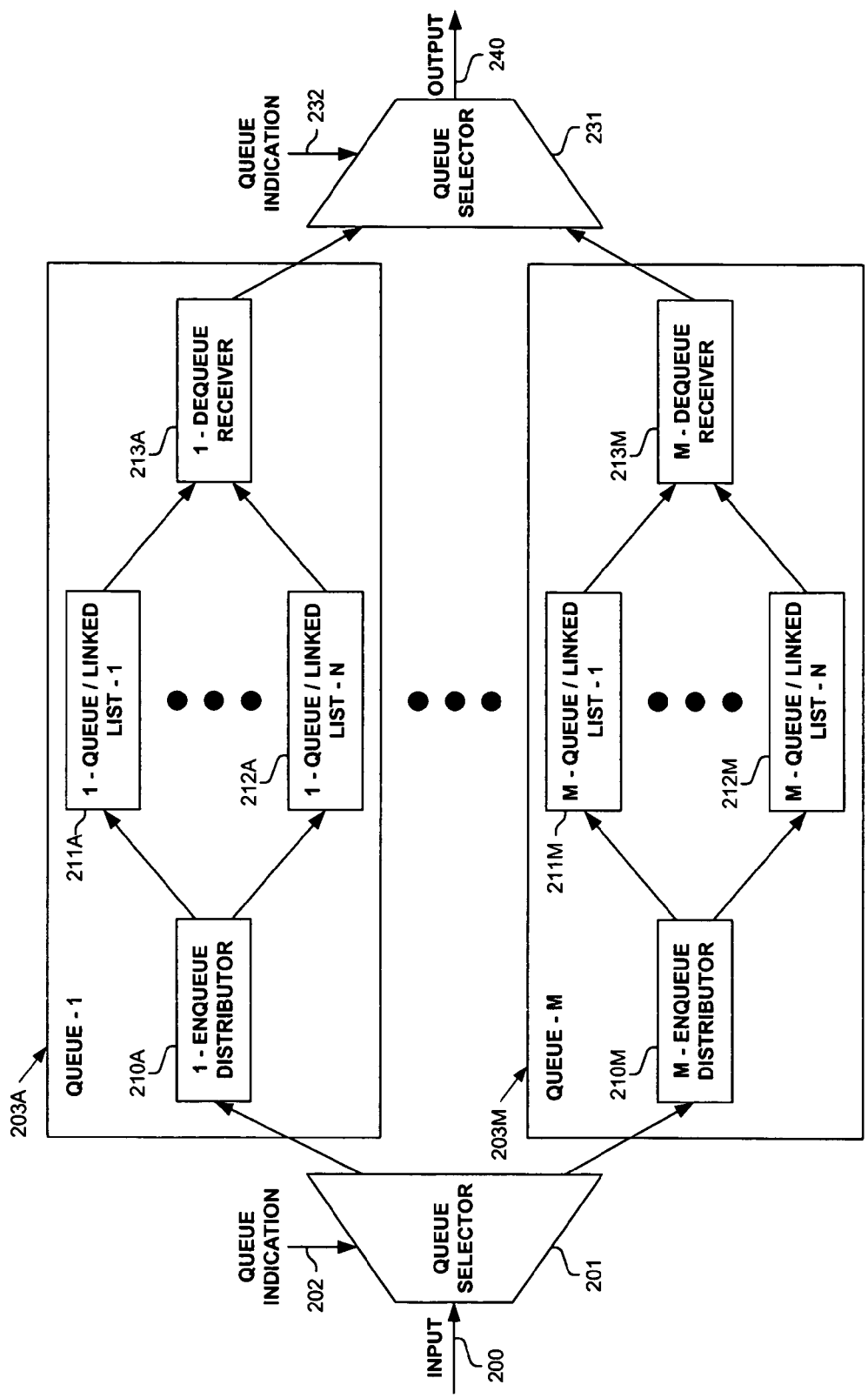
FIG. 2A is a block diagram illustrating a system including multiple queues with each of the multiple queues comprising multiple sub-queues.

A system may also contain multiple data structures, each implemented with multiple sub-data structures. One embodiment of such a system having multiple queues each with multiple sub-queues implemented using a linked list or some other data structure (e.g., a ring buffer, consecutive memory addresses especially when storing fixed blocks of information, etc.) is illustrated in FIG. 2A. Blocks of an information stream 200 are received by queue selector 201. Queue selector 201 receives an indication 202 of which queue to store a particular block of information. This indication 202 may be derived from information contained in a packet or packet header, a destination or other address, a type or quality of service, or based on some other criteria or any combination of criteria. The received block of information is then forwarded by queue selector 201 to the queue 203A-M indicated by queue indication 202. The number of queues typically varies depending on the needs of the system using the queues. For example, there might be one queue for each destination, for each destination for each quality of service, etc. In the same manner as previously described herein, information is added to a particular queue 203A-M using an enqueue distributor 210A-M to distribute to the sub-queues 211A-M to 212A-M in an order, such as via a round robin or other technique. This information is then received by dequeue receivers 213A-M in the same order from sub-queues 211A-M to 212A-M, and queue selector 231 based on queue indication 232 retrieves the information from an indicated one of the queues to produce an output stream 240. The order that queues 203A-M are selected may produce a different ordering of information, and this queue selection may be based on queue occupancy, quality of service, flow control information, other criteria, or combinations of criteria.

Figure 2C:
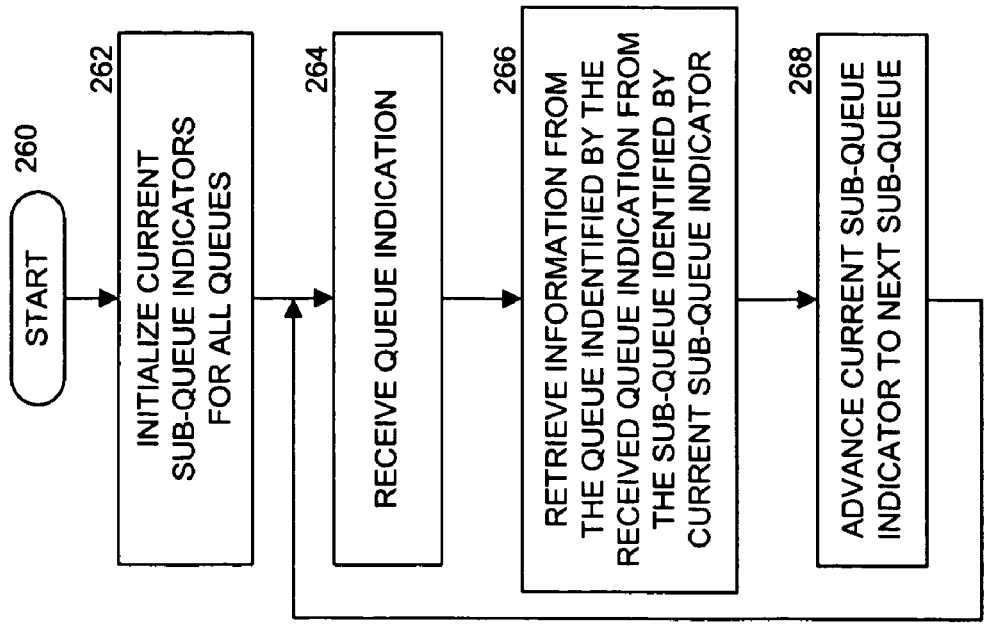
FIGS. 2B-C are flow diagrams of processes used in one embodiment for enqueuing and dequeuing elements to a selected one of multiple queues with each of the multiple queues comprising multiple sub-queues.
Figure 2B:
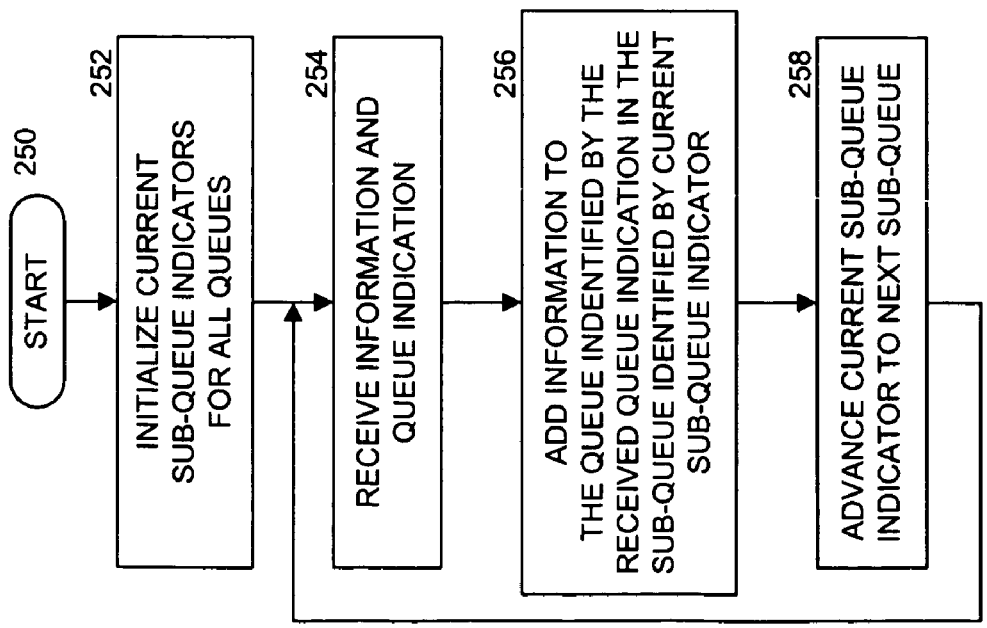

FIGS. 2B-C illustrate embodiments of process for enqueuing and dequeuing elements to multiple queues, each of the multiple queues comprised of multiple sub-queues. Processing of the flow diagram illustrated in FIG. 2B commences with process block 250, and proceeds to process block 252, wherein the current sub-queue indicators are initialized for all the queues. Next, in process block 254, information to be stored in one of the queues along with an indication of which queue are received. In process block 256, this received information is placed in the sub-queue indicated by the sub-queue indicator for the indicated queue. The sub-queue indicator for the indicated queue is then advanced to the next sub-queue in the order in process block 258. Process blocks 254-258 are repeated to store received information to the various queues and to distribute the information among their respective sub-queues.

Processing of the flow diagram illustrated in FIG. 2C commences with process block 260, and proceeds to process block 262, wherein the current sub-queue indicators are initialized for all the queues. Next, in process block 264, an indication of a queue from which to retrieve information is received. Next, in process block 266, the information is retrieved from the sub-queue indicated by the sub-queue indicator for the indicated queue, and in process block 268, this sub-queue indicator is advanced to the next sub-queue in the order. Process blocks 264-268 are repeated to extract information from the queues, and from their respective sub-queues in the order initially received at the respective queue.

Figure 3:
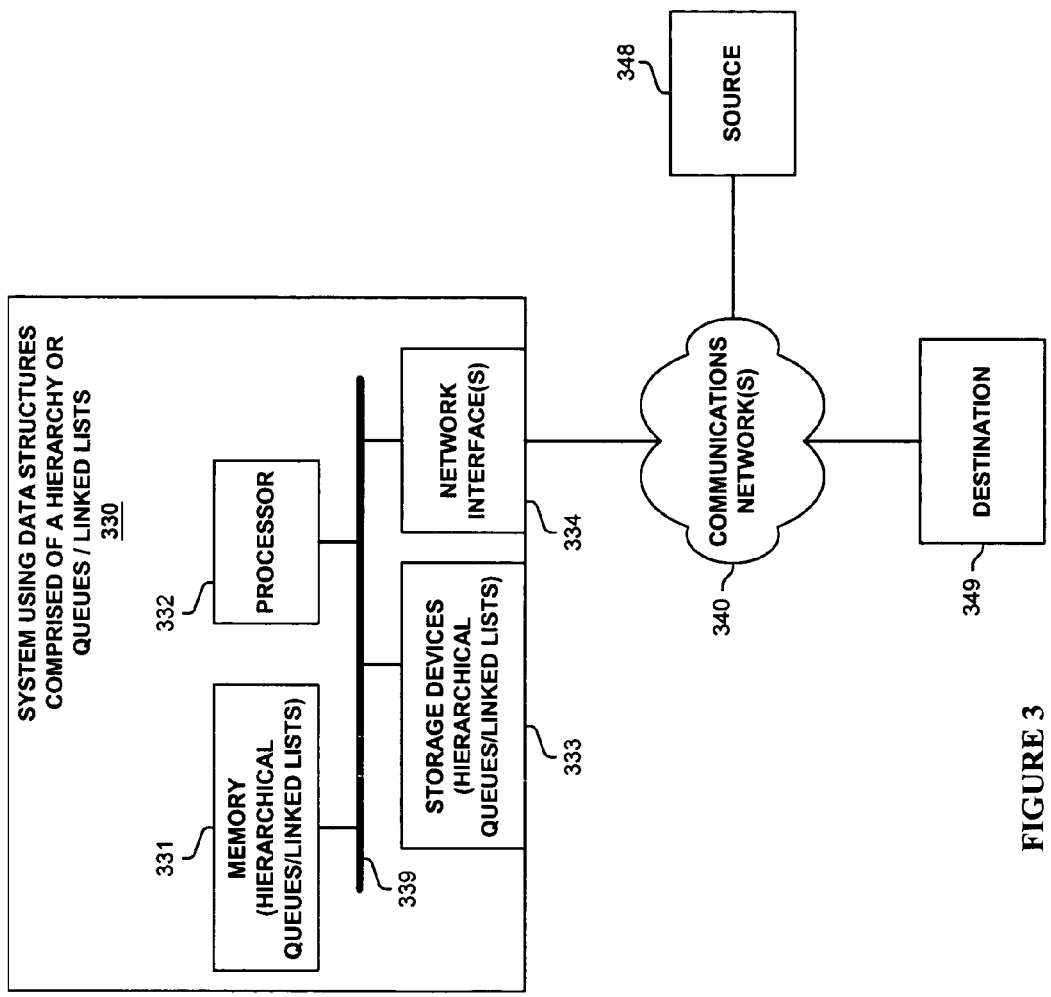
FIG. 3 is a block diagram of one embodiment of a system using a hierarchy of queues and/or linked lists.

FIG. 3 illustrates one embodiment of a system for implementing and using queues and/or linked list data structures comprised of a hierarchy of queues or linked list data structures which may be used, inter alia, in a computer or communications system, such as a computer or communications device, workstation, packet switching system, router, line card, part of a larger system, other device, or component thereof.

Shown in FIG. 3 is one embodiment of a system 330 implementing and using data structures comprising a hierarchy of queues and/or linked list data structures. As shown, system 330 comprises a processor 332, memory 331, storage devices 333, and optional network interface(s) 334, which are electrically coupled via one or more communications mechanisms 339 (shown as a bus for illustrative purposes). Memory 331 is one type of computer-readable medium, and typically comprises random access memory (RAM), read only memory (ROM), integrated circuits, and/or other memory components. Memory 331 typically stores computer-executable instructions to be executed by processor 332 and/or data (e.g., data structures comprising a hierarchy of queues and/or linked list data structures) which is manipulated by processor 332 for implementing functionality in accordance with the invention. Storage devices 333 are another type of computer-readable medium, and typically comprise disk drives, diskettes, networked services, tape drives, and other storage devices. Storage devices 333 typically store computer-executable instructions to be executed by processor 332 and/or data (e.g., data structures comprising a hierarchy of queues and/or linked list data structures) which is manipulated by processor 332 for implementing functionality in accordance with the invention.

As used herein and contemplated by the invention, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

In one embodiment, system 330 includes network interface(s) 334, which are connected to one or more communications network(s) 340 (e.g., one or more networks, including, but not limited to the Internet, private or public telephone, cellular, wireless, satellite, cable, local area, metropolitan area and/or wide area networks) over one or more links. In this manner, packets of information may be sent from source 348, routed across one or more communication networks 340 to system 330. System 330 queues the packets in its queues comprised of a hierarchy of sub-queues or linked lists, and then forwards them across one or more communication networks 340 to destination 349. In one embodiment, system 330 is part of a line card, switching or other component of a packet switching system, router, or communications device. In one embodiment, system 330 is the destination of information sent from source 348, and system 330 queues the packets in its queues comprised of a hierarchy of sub-queues or linked lists, and then processes them. In one embodiment, system 330 is part of a computer or communications system.

Figure 4:
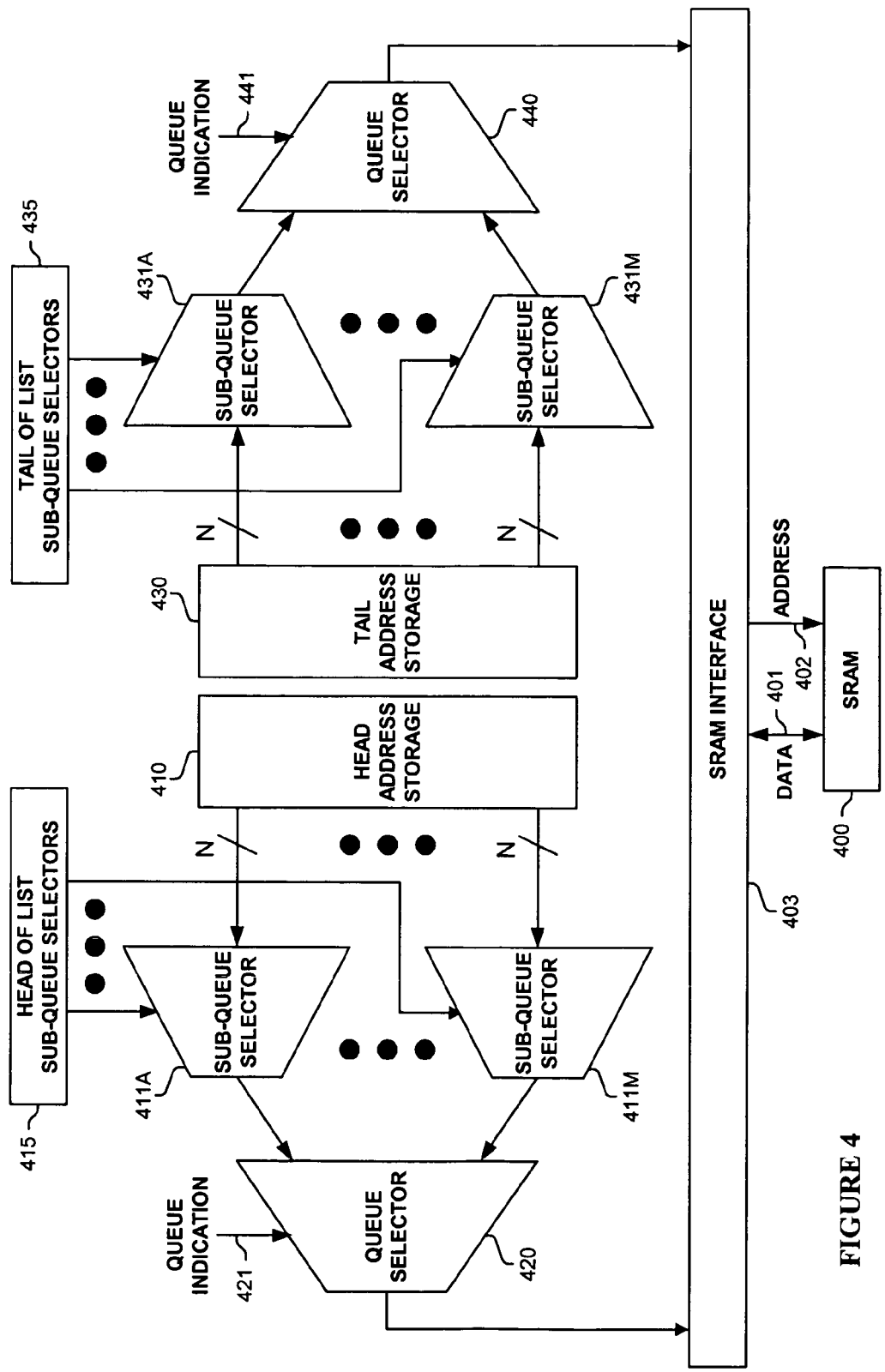
FIG. 4 is a block diagram of one embodiment of a circuit implementing multiple queues and linked list data structures using a hierarchy of queues and linked list data structures.

FIG. 4 illustrates one embodiment of a system for maintaining M queues, each of the M queues comprised of N sub-queues implemented in the form of linked lists. Of course, other embodiments use data structures other than those of a linked list.

First, referring to the right-hand portion of FIG. 4, the tail address of the sub-queues are maintained in tail address storage 430 for each of the multiple queues. Tail of list sub-queue selectors 435 maintain an indication of a current sub-queue to which to add an entry for each of the multiple queues. In one embodiment, tail of list sub-queue selectors 435 include multiple counters, registers, and/or memory locations. Tail of list sub-queue selectors 435 are connected to multiple sub-queue selectors 431A-M which then provide an indication of the currently sub-queue for each queue to queue selector 440. Queue selector 440 then selects one of the queues based on the received queue indication 441, which is then provided to SRAM interface 403 which provides address 402 to SRAM 400 wherein the actual information is stored as indicated by data 401. After the information is stored (or the information and the determined storage address are latched), the particular tail of list sub-queue selector is advanced to the next sub-queue for the previously selected queue. In one embodiment, a $\log_2 N$ bit wrap-around counter is advanced or a register is updated by control logic.

Similarly, the left-hand side of FIG. 4 is used to retrieve information from one of the multiple queues. The head address of the sub-queues are maintained in head address storage 410 for each of the multiple queues. Head of list sub-queue selectors 415 maintain an indication of a current sub-queue to which to remove an entry for each of the multiple queues. In one embodiment, head of list sub-queue selectors 415 include multiple counters, registers, and/or memory locations. Head of list sub-queue selectors 415 are connected to multiple sub-queue selectors 411A-M which then provide an indication of the currently sub-queue for each queue to queue selector 420. Queue selector 420 then selects one of the queues based on the received queue indication 421, which is then provided to SRAM interface 403 which provides address 402 to SRAM 400 wherein the actual information is read as indicated by data 401. After the information is read (or the determined storage address is latched), the particular head of list sub-queue selector is advanced to the next sub-queue for the previously selected queue. In one embodiment, a $\log_2 N$ bit wrap-around counter is advanced or a register is updated by control logic.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A line card of a router including a queue, the queue comprising:
   one or more storage elements for storing a plurality of data structures, each of the plurality of data structures including a plurality of sub-data structures capable of storing a plurality of stored pieces of a plurality of pieces of information;
   a storage selector configured to select among the plurality of data structures for a particular piece of the plurality of pieces of information;
   a distributor; and
   a receiver;
   wherein the distributor is configured to distribute each of the plurality of pieces of the information to be added to a particular one of the plurality of data structures across the plurality of sub-data structures belonging to the particular one of the plurality of data structures in a predetermined sequence order defined across the plurality of sub-data structures and including each of the plurality of sub-data structures; and the receiver is configured to receive the items from the plurality of sub-data structures in the sequence order such that the plurality of pieces of information are received by the receiver from the particular one of the plurality of data structures in a first-in the particular one of the plurality of data structures, first-out the particular one of the plurality of data structures order;
   wherein the sequence order is a round robin order among the plurality of sub-data structures; and
   wherein the distributor includes a counter configured to identify the sequence order.

2. The line card of claim 1, wherein each of the sub-data structures includes a linked-list data structure configured for storing pieces of information of the plurality of pieces of information.

3. The line card of claim 2, wherein the queue comprises a storage for storing a head and a tail of the linked list data structure of each of the plurality of sub-data structures.

4. The line card of claim 1, wherein the distributor is configured to said distribute the plurality of pieces of the information among the plurality of sub-data structures without regard to the content of piece of the plurality of pieces of the information.

5. The line card of claim 1, wherein said pieces of information correspond to packets.

6. A method performed by a single appliance, the method comprising:
   (a) receiving a particular piece of information of a stream of pieces of information to be added to a queue, the queue including a plurality of sub-queues with each of capable of storing a plurality of pieces of information in the stream of pieces of information;
   (b) adding the particular piece of information to a currently selected one of the plurality of sub-queues to which to add information;
   (c) advancing the currently selected one of the plurality of sub-queues to which to add information to a next one of the plurality of the sub-queues to which to add information in a predetermined order among the plurality of sub-queues independent of the stream of information;
   (d) removing information from a currently selected one of the plurality of sub-queues to which to remove information;
   (e) advancing the currently selected one of the plurality of sub-queues to which to remove information to a next one of the plurality of sub-queues to which to remove information in the predetermined order; and
   repeatedly performing steps (a)-(c) to add information to the queue and steps (d)-(e) to remove information from the queue such that pieces of information of the stream of pieces of information are added to queue and removed from the queue in the same order.

7. The method of claim 6, wherein the predetermined order among the plurality of sub-queues is a round robin order among the plurality of sub-queues.

8. The method of claim 6, wherein said pieces of information correspond to packets.

9. A queue for storing items of a stream of information with said items received in a particular order, the queue being implemented by a single apparatus, the queue comprising:
   a plurality of sub-queues, each of the plurality of sub-queues capable of storing a plurality of items;
   an enqueue distributor configured to receive said items of the stream of information in said particular order, and configured to distribute said items to the plurality of sub-queues in a predetermined sequence order among the plurality of sub-queues such that each of said items are only stored in a single one of the plurality of sub-queues; and
   a dequeue receiver configured to only receive said items of the stream of information from the plurality of queues in the predetermined sequence order and to forward said items in said particular order;
   wherein the predetermined sequence order is a round robin order among the plurality of sub-queues;
   wherein the enqueue distributor includes a counter for use in identifying the predetermined sequence order;
   wherein said items correspond to packets.

10. The queue of claim 9, wherein the enqueue distributor is configured to said distribute the plurality of items among the plurality of sub-queues without regard to the content of items of the plurality of items.

11. A queue for storing items of a stream of information with said items received in a particular order, the queue being implemented by a single apparatus, the queue comprising:
   a plurality of sub-queues, each of the plurality of sub-queues capable of storing a plurality of items;

means for receiving said items of the stream of information in said particular order, and for distributing said items to the plurality of sub-queues in a predetermined sequence order among the plurality of sub-queues such that each of said items are only stored in a single one of the plurality of sub-queues, wherein items distributed to a sub-queue are stored in the sub-queue wherein the means for receiving includes a counter for identifying the predetermined sequence order; and means for retrieving said items of the stream of information from the plurality of queues in the predetermined sequence order and for forwarding said items in said particular order, wherein the sequence order among the plurality of sub-queues is predetermined and independent of the content of said items of the stream of information;

wherein the predetermined order is a round robin among the plurality of sub-queues; and wherein said items correspond to packets.

12. A queue, comprising:

means for adding information to the queue, including means for repeatedly performing: (a) receiving a particular piece of information of a stream of pieces of information to be added to the queue, the queue including a plurality of sub-queues with each of capable of storing a plurality of pieces of information in the stream of pieces of information; (b) adding the particular piece of information to a currently selected one of the plurality of sub-queues to which to add information; (c) advancing the currently selected one of the plurality of sub-queues to which to add information to a next one of the plurality of the sub-queues to which to add information in a predetermined order among the plurality of sub-queues independent of the stream of information; and means for removing information from the queue such that pieces of information of the stream of pieces of information are added to queue and removed from the queue in the same order, wherein said means for removing information from the queue includes means for repeatedly performing: (d) removing information from a currently selected one of the plurality of sub-queues to which to remove information; and (e) advancing the currently selected one of the plurality of sub-queues to which to remove information to a next one of the plurality of sub-queues to which to remove information in the predetermined order.

13. The queue of claim 12, wherein the predetermined order among the plurality of sub-queues is a round robin order among the plurality of sub-queues.

14. The queue of claim 13, wherein said pieces of information correspond to packets.

15. An apparatus comprising one or more processors and memory, wherein the memory stores one or more instructions that, when executed by said one or more processors, perform operations comprising:

(a) receiving a particular piece of information of a stream of pieces of information to be added to a queue, the queue including a plurality of sub-queues with each of capable of storing a plurality of pieces of information in the stream of pieces of information;

(b) adding the particular piece of information to a currently selected one of the plurality of sub-queues to which to add information;

(c) advancing the currently selected one of the plurality of sub-queues to which to add information to a next one of the plurality of the sub-queues to which to add information in a predetermined order among the plurality of sub-queues independent of the stream of information;

(d) removing information from a currently selected one of the plurality of sub-queues to which to remove information;

(e) advancing the currently selected one of the plurality of sub-queues to which to remove information to a next one of the plurality of sub-queues to which to remove information in the predetermined order; and repeatedly performing steps (a)-(c) to add information to the queue and steps (d)-(e) to remove information from the queue such that pieces of information of the stream of pieces of information are added to queue and removed from the queue in the same order.

16. The apparatus of claim 15, wherein the predetermined order among the plurality of sub-queues is a round robin order among the plurality of sub-queues.

17. The apparatus of claim 15, wherein said pieces of information correspond to packets.

* * * * *

UNITED STATES PATENT AND TRADEMARK OFFICE
CERTIFICATE OF CORRECTION

| | | |
|---|---|---|
| PATENT NO. | : 7,627,870 B1 | |
| APPLICATION NO. | : 09/845606 | |
| DATED | : December 1, 2009 | |
| INVENTOR(S) | : Amir Michaeli | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1269 days.

Signed and Sealed this
Eleventh Day of January, 2011

David J. Kappos
*Director of the United States Patent and Trademark Office*